(12) United States Patent
Melbouci et al.

(10) Patent No.: US 7,384,892 B2
(45) Date of Patent: Jun. 10, 2008

(54) WATER-BASED DRILLING FLUIDS

(75) Inventors: Mohand Melbouci, Wilmington, DE (US); Arjun C. Sau, Newark, DE (US)

(73) Assignee: Hercules Incorporated, Wilmington, DE (US)

( * ) Notice: Subject to any disclaimer, the term of this patent is extended or adjusted under 35 U.S.C. 154(b) by 351 days.

(21) Appl. No.: 10/896,672

(22) Filed: Jul. 22, 2004

(65) Prior Publication Data

US 2006/0019834 A1 Jan. 26, 2006

(51) Int. Cl.
- C09K 8/035 (2006.01)
- C09K 8/08 (2006.01)
- C09K 8/20 (2006.01)
- C09K 8/24 (2006.01)
- E21B 43/00 (2006.01)

(52) U.S. Cl. ............. 507/104; 507/106; 507/112; 507/113; 507/114; 507/120; 507/129; 507/134; 507/136; 507/141; 507/143

(58) Field of Classification Search ............. 507/104, 507/106
See application file for complete search history.

(56) References Cited

U.S. PATENT DOCUMENTS

| | | | | | |
|---|---|---|---|---|---|
| 3,479,336 A | * | 11/1969 | Abson et al. | ................. | 536/65 |
| 3,483,007 A | * | 12/1969 | Hook | ................. | 106/694 |
| T0,103,401 I4 | * | 9/1983 | Majewicz | ................. | 166/308.1 |
| 4,439,328 A | * | 3/1984 | Moity | ................. | 507/204 |
| 4,532,052 A | * | 7/1985 | Weaver et al. | ................. | 507/222 |
| 4,579,942 A | * | 4/1986 | Brode et al. | ................. | 536/84 |
| 4,888,120 A | | 12/1989 | Mueller et al. | ................. | 252/8.551 |
| 5,028,342 A | | 7/1991 | Opitz et al. | ................. | 252/8.513 |
| 5,859,236 A | * | 1/1999 | Burkart | ................. | 536/56 |
| 5,972,118 A | * | 10/1999 | Hester et al. | ................. | 127/1 |
| 2005/0228174 A1 | * | 10/2005 | Gillette et al. | ................. | 536/86 |

OTHER PUBLICATIONS

Drilling Fluids Optimization: A Practical Field Approach, J. L. Lummus and J. J. Azar, Penn Well Publishing Company: Tulsa, Oklahoma, pp. 19-27, 1986.
Carboxymethylcellulose From Cotton Linters, B. Kh. Muinov et al, Uzb. Khim. Zh., No. 6, 19, 1983.

* cited by examiner

*Primary Examiner*—Randy Gulakowski
*Assistant Examiner*—John J Figueroa
(74) *Attorney, Agent, or Firm*—Robert O'Flynn O'Brien

(57) ABSTRACT

A water-based drilling fluid composition includes water and at least one rheology modifier and/or fluid loss control agent, and at least one other ingredient of polymeric additive, inorganic salts, dispersants, shale stabilizers, weighting agents, or finely divided clay particles, depending upon the desired attributes, wherein the rheology modifier and/or the fluid loss control agent comprises carboxymethylated raw cotton linters (CM-RCL) made from the baled raw cotton linters or comminuted raw cotton linters with increased bulk density.

53 Claims, No Drawings

WATER-BASED DRILLING FLUIDS

FIELD OF INVENTION

This invention relates to the use of anionically charged polymers in drilling fluids. More specifically, this invention relates to the use of carboxymethylated raw cotton linters as an effective additive to control the rheology and/or reduce fluid loss of water-based drilling fluids.

BACKGROUND OF THE INVENTION

Rotary drilling is the most common drilling technology practiced in the oil patch today. Although drilling operations have matured, the increase of economic interests by maximizing the oil recovery capacity have led towards more complex drilling operations, such as deep water drilling, multi-well drilling and horizontal drilling. To accomplish the drilling operations as rapidly and as economically as possible, a great deal of planning and forethought must be put into the drilling program. Among many other parameters, the design of well-adapted drilling fluids is one of the most critical factors for the success of the drilling operations. The drilling fluids are primarily dependent upon the geological formation being drilled and the problems associated with such type of formation.

During the drilling operations, the drilling fluid is injected into the well through the drill pipe and re-circulated to the surface in the annular area formed by the wellbore wall and the drill string. Once back at the surface, the drilling fluid is physically and chemically treated and conditioned before it is pumped back into the well.

The drilling apparatus is comprised of a column of drill pipes to the bottom of which is attached a multi-pronged drill bit. To drill the ground, the column of drill pipes is rotated to cut the earth. As drilling continues, cuttings are accumulated. To facilitate drilling, these cuttings have to be continuously removed from the vicinity of the drill bits at the bottom of the hole. The drilling fluid is pumped down-hole through the drill pipe and pumped through nozzles at the drill bit. The generated cuttings are removed from the down-hole to the surface by the drilling fluid through the annular space between the formation and the drill pipe. Depending on whether the continuous phase is water, oil, pseudo-oil, or gas, the drilling fluid is called water-based, oil-based, pseudo-oil based or foam-based. Water-based drilling fluids are preferred over oil-based or pseudo oil-based for economic and environmental reasons.

According to American Petroleum Institute (API), drilling fluid is defined as a circulating fluid used in rotary drilling to perform any or all of the various functions required in drilling operations (J. L. Lummus and J. J. Azar, in "Drilling Fluids Optimization: A Practical Field Approach"; Penn Well Publishing Company: Tulsa Okla., pp. 19-27, 1986). The main functions of the drilling fluid are to: (i) cool, clean and lubricate the drill bit, (ii) suspend the drill cuttings from the drilling operations, (iii) carry them to the surface and remove them from the bottom of the borehole, (iv) prevent loss of excessive amounts of fluids from flowing from the hole into surrounding formations by forming on the wall of hole a thin and impervious filter cake, (v) serve as a fluid column to exert sufficient hydrostatic pressure to counterbalance the formation pressure (water, gas, oil or other earth fluid) and (vi) prevent caving or other intrusions into the drill hole.

To perform these functions, an efficient drilling fluid must exhibit numerous characteristics, such as desired rheological properties (plastic viscosity, yield value and low-end rheology, gel strengths), fluid loss prevention, stability under various temperature and pressure operating conditions, stability against contaminating fluids, such as salt water, calcium sulfate, cement and potassium contaminated fluids, etc. A wide variety of additives are added to drilling fluid formulations to achieve the above performance properties. These include soluble or insoluble inorganic and organic species, and water-soluble or-swellable clays and polymers.

Drilling fluids, often referred to as muds or drilling muds in the oil industry (both terms will be used interchangeably in the present document), can be classified on the basis of their principal constituent (continuous phase). The continuous phase may be water, oil, pseudo-oil and gas. The resulting drilling fluids are called water-based muds (WBMs), oil-based muds (OBMs), synthetic or pseudo-oil based muds (SBMs or POBMs, respectively) and foam muds, respectively. Depending upon the type of the drilling fluid, the continuous phase may additionally contain dissolved organic and inorganic additives and suspended, finely divided solids of various types. Each of these muds has advantageous and disadvantageous features.

Oil-Based Muds

They have oil as the continuous phase. The oil most often selected is diesel oil, mineral oil and low toxicity mineral oil. Because some water will always be present, the oil-based mud must contain water-emulsifying agents. If water is purposely added (for economical reasons), the oil-based mud is called an "invert emulsion mud". Various thickening and suspending agents as well as barite are added. The emulsified water may contain alkalies and salts.

Due to their continuous phase, OBMs are known to provide unequaled performance attributes with respect to the rate of penetration, shale inhibition, wellbore stability, high lubricity, high thermal stability and high salt tolerance. However, they are subjected to strict environmental regulation regarding their discharge and recycling.

Pseudo Oil-Based Muds (Synthetic Oil-Based Muds)

POBMs (or SBMs) are made on the same principle as OBMs. They have been developed to maintain the performance characteristics of OBMs while reducing their environmental impact. The objective behind the design of these drilling fluids is to exchange the diesel oil or mineral oil base with an organic fluid which exhibits a lower environmental impact. The organic fluids used are esters, poly-olefins, acetal, ether and linear alkyl benzene. As with OBMs, POBMs may contain various ingredients, such as thickening and suspending agents, emulsifying agents as well as weighting agents.

POBMs were developed to technically maintain the performance characteristics of OBMs while reducing their environmental impact. They are, however, not as stable as OBMs depending upon the continuous phase. From environmental perspective, the current legislation is becoming as strict for POBMs as for OBMs.

Gas-Based Muds

Although natural gas (methane), exhaust or combustion gases can be used, air is the most common gas drilling fluid. Air is used to produce the so-called "Foam Muds" in which air bubbles are surrounded by a film of water containing a foam-stabilizing substance or film-strengthening materials, such as organic polymers or bentonite. This type of muds is not re-circulated and is particularly used for reduced-pressure drilling to improve the hole stability in caving formations. However, this type of muds has some use limitation with respect to drilling water-producing or wet formations as well as a limited salt tolerance.

Conventional Water-Based Muds

They have water as the continuous phase. Water may contain several dissolved substances. These include alkalies, salts and surfactants, organic polymers in colloidal state, droplets of emulsified oil and various insoluble substances, such as barite, clay and cuttings in suspension. The mud composition selected for use often depends on the dissolved substances in the most economically available makeup water or on the soluble or dispersive materials in the formations to be drilled. Several mud "types" or "systems" are recognized and described in the literature such as, but not limited to: spud muds, dispersed/deflocculated muds, lime muds, gypsum muds, salt water muds, non-dispersed polymer muds, inhibitive potassium muds, cationic muds and mixed metal hydroxide (MMH) muds.

Despite their environmental acceptance, conventional WBMs exhibit major deficiencies relative to OBMs/POBMs with regard to their relatively poor shale inhibition, lubricity and thermal stability characteristics. To overcome those deficiencies, specific additives may, however, be added into the WBM compositions to deliver properties approaching, even though not as good as OBMs/POBMs performance while minimizing the environmental impact.

Consequently, to meet the new environmental regulations while extending the technical performance of water based drilling fluids, a new generation of water based fluids, also called "inhibitive drilling fluids" was developed to compete against OBMs. Also, to minimize the formation damage, new types of non-damaging drilling fluids, called "drill-in-fluid", have been developed to drill the pay-zone formations Inhibitive Water-Based Muds Minimizing the environmental impact of the drilling process is a highly important part of drilling operations to comply with environmental regulations that have become stricter throughout the world. In fact, this is a mandatory requirement for the North Sea sector. The drilling fluids industry has made significant progress in developing new drilling fluids and ancillary additives that fulfill the increasing technical demands for drilling oil wells. These additives have very little or no adverse effects on the environment or on drilling economics.

New drilling fluid technologies have been developed to allow the continuation of oil based performance with regard to formation damage, lubricity and wellbore stability aspects and thus penetration rates. These aspects were greatly improved by incorporating polyols or silicates as shale inhibitors in the fluid systems.

Polyols based fluids contain a glycol or glycerol as a shale inhibitor. These polyols are commonly used in conjunction with conventional anionic and cationic fluids to provide additional inhibition of swelling and dispersing of shales. They also provide some lubrication properties.

Sodium silicates or potassium silicates are known to provide levels of shale inhibition comparable to that of OBMs. This type of fluids is characterized by a high pH (>12) for optimum stability of the mud system. The inhibition properties of such fluids are achieved by the precipitation or gelation of silicates on contact with divalent ions and lower pH in the formulation, providing an effective water barrier that prevents hydration and dispersion of the shales.

Drill-In-Fluids

After drilling a well to the total depth, it is a normal practice to replace the drilling mud with a completion fluid. This fluid is a "clean", solids-free, (or acid soluble), non-damaging formulation, intended to minimize reductions in permeability of the producing zone. Prior to producing from the formation, it is usually necessary to clean up what is left by the original mud and the completion fluid, by breaking and degrading the filter cake with an oxidizer, enzyme or an acid solution.

Nowadays, many wells exploit the pay-zone formations horizontally and for long distances. It is no longer practical in these wells to drill the pay-zone with conventional solids-laden muds as the extended clean-up process afterwards is much more difficult. Consequently, the modern generation of drill-in-fluids were developed.

Drill-in-fluids are completion fluids, but they also act as drilling muds. As the pay-zone is penetrated horizontally, these fluids must provide the multifunctional requirements of drilling fluids in addition to the "non-damaging" attributes of completion fluids. In practice, therefore, the normal drilling mud is replaced with a drill-in-fluid just before the pay-zone is penetrated, and used until the end of operations.

Fluid loss prevention is a key performance attribute of drilling fluids. For water-based drilling fluids, significant loss of water or fluid from the drilling fluid into the formation can cause irreversible change in the drilling fluid properties, such as density and rheology occasioning instability of the borehole. Fluid loss control is measured in the laboratory according to the standard procedure (API-RP-13B) for testing drilling fluids.

A wide variety of water-soluble or water-swellable polymers, such as cellulosics, starches, guar gums, xanthan gums, and synthetic polymers and copolymers of acrylamide, acrylic acid, acrylonitrile, and 2-acrylamido-2-methylpropanesulfonic acid (AMPS) are used in water-based drilling fluids. The most commonly used polymers used to build viscosity are the cellulosics, guar gums, xanthan gums, and polyacrylates. Among cellulosics, carboxymethylcellulose (CMC), polyanionic cellulose (PAC) and carboxymethylhydroxyethylcellulose (CM-HEC) are used. Among them, CMC and PAC are the most preferred ones based on their cost and performances to control viscosity (often combined with xanthan gum) and fluid retention (often combined with starches) during well drilling. They are generally available in two main grades, designated as high viscosity ("Hivis") and low viscosity grades ("Lovis"). Hivis PACs are primarily used for viscosity control and secondarily for fluid loss control while Lovis PACs are primarily used as fluid loss reducer; Lovis PACs are not supposed to contribute to the viscosity of the drilling fluid system. In most cases, both types are used together in a drilling fluid composition. During drilling operations, optimum drilling fluid attributes are further achieved by combining different types of additives such as CMC, PAC, xanthan gum (primary rheology modifier), starches (improved filtration control) and other synthetic polymers that may be required for dispersing or shale inhibition properties.

U.S. Pat. No. 5,028,342 describes the use of a mixture of CMC made from raw linters and polycarboxylic acid to achieve good temperature stability and high electrolyte compatibility for use in drilling muds. The polymer blend was made by mixing an alcohol-moist technical grade CMC (carboxymethyl degree of substitution=1.3) made from raw linters and/or wood cellulose with a solution of the sodium salt of a homopolymer of polyacrylic acid and drying the resultant mixture.

Muniov et al. (B. Kh. Muniov, A. A. Alimov, A Abidkhanov and K. S. Akhmedov, Uzb. Khim. Zh., No. 6, 19, 1983)

prepared CMC (DS ~0.8) in a high solids process from raw cotton linters. The CMCs thus made were suggested to be a stabilizer for drilling muds in oil and gas wells.

Although existing grades of CMC and PAC provide a range of performance in drilling fluids, there still is a need for more efficient and economical polymers to function as effective viscosifiers and fluid loss control agents.

SUMMARY OF THE INVENTION

The present invention is directed to a water-based drilling fluid composition comprising, water and at least one thickener and/or fluid loss agent, and at least one other ingredient selected from the group consisting of inorganic salts, dispersants, shale inhibitors and finely divided solids particles (e.g., bentonite, attapulgite, sepiolite, calcium carbonate, etc.), depending upon the desired attributes, wherein the thickener and/or the fluid loss control agent is a carboxymethylated raw cotton linters (CM-RCL). The CM-RCL is isolated as a salt or a free acid. The countercations of the CM-RCL could be lithium, sodium, potassium, calcium, aluminium, barium, magnesium, ammonium, etc. or a mixture thereof.

DETAILED DESCRIPTION OF THE INVENTION

It was surprising to find that CM-RCL efficiently viscosified water-based drilling fluids and provided significantly improved fluid loss control relative to existing CMCs or PACs.

Raw cotton linters (RCL) is a naturally occurring lignocellulosic material. It is obtained by delinting the leftover fibers from the cottonseed surface after removal of staple fibers. In addition to cellulose, which is a high molecular weight polymer of glucose, RCL contains lignin and hemicellulose that are also high molecular weight species. One of the unique attributes of RCL is that the molecular weights of its polymeric species (cellulose, lignin and hemicellulose) and the fiber structures of RCL remain intact during the delinting process. By contrast, isolation of purified celluloses from RCL and wood pulps involving thermal, mechanical and chemical means occasions removal of lignin and hemicellulose and substantial molecular weight loss of the recovered cellulose.

Compositionally, RCL contains about 80-85% cellulose, about 1.5-2.5% lignin and about 2.5-3.5% hemicellulose (B. Kh. Muniov, A. A. Alimov, A Abidkhanov and K. S. Akhmedov, Uzb. Khim. Zh., No. 6, 19, 1983). The rest being seed hulls, dirt, field trash, wax, fat, protein, moisture and traces of other organic impurities. Numerous experimental facts and studies relating to the ultrastructure of lignocellulosic materials point that covalent linkages probably exist between lignin and hemicellulose in addition to other types of non-covalent bonding, such as hydrogen bonding, van der Waals force, chemisorption, etc. (D. Fengel and G. Wegener, Wood: Chemistry, Ultrastructure, Reaction, Walter de Gruyter, Berlin, N.Y., 1984; E. E. Harris, E. C. Sherrard and R. Mitchell, J. Am. Chem. Soc., 56, 889, 1934; A. G. Norman, in High Polymers: Cellulose and Cellulose Derivatives, E. Ott and H. M. Spurlin (Eds.), p. 459, 1954; Interscience Publishers, New York). It is now well accepted that in ligno-cellulosic materials, the lignin is covalently connected to the hemicellulose which in turn is connected to the cellulose chains through hydrogen bonding to form an ultrastructure (T. Koshijima, T. Watanabe and F. Yaku, in "Lignin-Properties and Materials", ACS Synposium Series No. 397, p. 11, 1989; W. G. Glasser and S. Sarkanen (Eds.), Am. Chem. Soc., Washington, D.C.). Since the intermolecular connections among lignin, hemicellulose and cellulose are three-dimensional, the lignin-hemicellulose moiety can be viewed as a connector between cellulose chains.

Currently, lignin and hemicellulose are removed from RCL fiber to improve its purity and whiteness. However, removal of lignin-hemicellulose moieties eliminates the long-range inter-molecular connections of cellulose chains that exist in virgin RCL fibers. In addition, during the purification, RCL fibers are subjected to harsh chemical treatments, such as digestion with caustic under pressure at elevated temperatures and bleaching with multiple oxidizing agents. These treatments occasion substantial molecular weight loss of cellulose chains. Thus, while purification of RCL is desirable to increase its cellulose content, removal of hemicellulose and lignin from RCL is undesirable to preserve the molecular weight of cellulose and maintain the ultrastructure of cellulose-lignin-hemicellulose composite.

To practice the present invention, CM-RCL can be made from "as supplied" RCL, such as first-cut, second-cut, third-cut and "mill run" RCL. If needed, seed hulls and other impurities that are physically held to the fibers could be substantially removed by mechanical means, such as sieving and centrifugation or a combination thereof prior to carboxymethylation. The separation of impurities from RCL can be done in the dry or wet condition.

To prepare the CM-RCL, the RCL can be used "as is" or pulverized or comminuted to shorten the fiber length. The pulverization can be carried out separately or it can be done simultaneously as the RCL is being treated with the base and/or the carboxymethylating agent. It is important that no substantial molecular degradation of the polymeric species present in RCL occurs during the pulverization step. To prevent this from happening, the pulverization should be conducted in an inert atmosphere and at low temperatures.

To enhance the reactivity towards the etherifying agent, the RCL can be treated with an inorganic or organic base or a mixture thereof. Examples of inorganic bases are lithium hydroxide, sodium hydroxide, potassium hydroxide, calcium hydroxide, ammonium hydroxide etc. Examples of strong organic bases include tertiary amines and quaternary ammonium hydroxides. A preferred base is sodium hydroxide. The CM-RCL compositions of the present invention are made by reacting alkalized RCL with a carboxymethylating agent, such as sodium chloroacetate (SCA). The SCA could also be generated in situ. The CM-RCL of the present invention can be further modified with non-ionic and ionic groups to achieve additional performance properties, such as improved salt tolerance, enhanced viscosity, yield point, gel strength and improved fluid retention capability.

Examples of non-ionic groups that can be incorporated into CM-RCL are methyl, ethyl, propyl, benzyl, $C_4$-$C_{30}$ hydrophobic groups. The $C_4$-$C_{30}$ hydrophobic groups could be aliphatic or aromatic. They could also be linear or branched. The composition of the hydrophobic groups could be hydrocarbon or fluorocarbon or fluorohydrocarbon groups or silicon-containing moieties. Non-ionic groups could also be incorporated into CM-RCL by alkoxylation of RCL and/or CM-RCL. Examples of alkoxylating agents are ethylene oxide, propylene oxide, butylene oxide, alkyl glycidyl ethers, glycidol, alpha-olefin oxides, etc. Examples of ionic groups are quaternary nitrogen containing groups, phosphonium groups, sulfoalkyl groups, sulfonate groups, phosphate groups, and phosphonate groups. These non-ionic and ionic substituents may be directly connected to the lignin, cellulose and hemicellulose present in the RCL.

Alkyl and hydrophobic groups can also be attached to the carboxymethyl groups of the CM-RCL by amidation, that is, by reacting the acid form of CM-RCL with an alkyl amine. The CM-RCL or its mixed derivatives can be also cross-linked with appropriate cross-linking agents to further improve the performances of CM-RCL in drilling fluids. Examples of ionic cross-linking agents include polyvalent metal ions, such as aluminum(III), zinc(II), calcium(II), magnesium (II), titanium (IV), zirconium (IV) etc. Examples of reagents that could be used to covalently cross-link CM-RCL include but not limited to are polyhalogeno reagents, such as dichloroacetic acid, trichloroacetic acid, diahalogenoalkanes. Other means of cross-linking CM-RCL would be to heat CM-RCL at elevated temperatures for sufficient length of time. Yet another means to cross-link CM-RCL would be to covert a portion of the sodium carboxylate groups ($—CH_2COO^- Na^+$) of CM-RCL into carboxylic acid ($—CH_2COOH$) and drying the resulting acidified CM-RCL at elevated temperatures for a sufficient length of time.

To prepare CM-RCL of the present invention, any raw cotton linters, such as first-cut, second-cut, third-cut or "mill run" raw cotton linters can be used. These are low cost alternatives to purified celluloses that are currently used to manufacture CMCs or PACs used in drilling fluids. A mixture of RCL and purified celluloses (wood pulps and purified cotton linters) can also be used.

To prepare CM-RCL of the present invention, a number of carboxymethylating agents can be used. These include sodium chloroacetate, sodium bromoacetate, potassium chloroacetate, a mixture of chloroacetic acid and an alkali metal hydroxide and esters of monochloroacetic acid. The most preferred caroboxymethylating agent being a mixture of chloroacetic acid and sodium hydroxide. The CM-RCL could be sodium, potassium or ammonium salt depending on the base used in the process. The countercation of the CM-RCL also can be changed by an appropriate ion exchange method.

The mixed ether derivatives of CM-RCL can be made by reacting the CM-RCL with additional etherifying agent(s). Alternatively, the RCL can be simultaneously modified with more than one etherifying agent using appropriate etherification conditions.

The etherification can be carried out either in the presence of a non-reactive organic diluent or without a diluent. Examples of organic diluents include methanol, ethanol, n-propyl alcohol, isopropanol, n-butyl alcohol, tertiary butyl alcohol, acetone, methyl ethyl ketone, dimethoxyethane, hydrocarbon solvents and other polar organic solvents without dissolving the RCL. The foregoing solvents can be used alone or as mixtures of two or more. Among these solvents, methanol, isopropanol, t-butyl alcohol and heptane are preferred. If no diluent is used, the RCL can be sprayed with an aqueous solution of the base under high shear followed by etherification with the etherifying agent. If the etherifying agent is a liquid at 15-20° C., it can also initially serve as a diluent. For gaseous etherifying agents, they can be added slowly to the alkalized RCL and heated to bring about etherification.

The CM-RCLs of the present invention can be made by carboxymethylating the RCL in a single step or in multiple steps. The most preferred one being the multi-step carboxymethylation of RCL. The details are shown in the Examples section.

To practice the utilization of the CM-RCL in water-based drilling fluids as a fluid loss control additive, the carboxymethyl degree of substitution (CM DS) of the CM-RCL should be from about 0.4 to about 2.2. Preferably, the CM DS should be from about 0.8 to 1.5 and most preferably the CM DS should be from about 1.0 to 1.2.

The CM-RCL can be used as an additive to water-based drilling fluids with or without purification. The term "purification" is defined as the removal of the low molecular weight by-products formed during the carboxymethylation of the raw cotton linters. These by-products can be removed partially or completely. The use level of the CM-RCL in the drilling fluid will be dictated by the purity of the CM-RCL. The purer the CM-RCL, the lesser the amount that needs to be used in the drilling fluid.

To meet the desired application properties, such as rheology, salt tolerance, fluid loss control of various types of water-based drilling fluids, the CM DS and molecular weight of the CM-RCL could be tailored. The molecular weight of the CM-RCL can be lowered by treating the CM-RCL with an acid, a mixture of caustic and oxygen, peroxides, hypochlorites, chlorites, cellulolytic enzymes and radiation. The molecular degradation of CM-RCL can be carried out in situ or after its isolation in a slurry process or solution.

The CM-RCL or its mixed derivatives could be purified using an appropriate solvent system to remove the low molecular weight by-products formed during the etherification. High molecular weight non-cellulosic components, such as carboxymethylated lignins and carboxymethylated hemicelluloses remain associated with the CM-RCL.

The CM-RCL or its mixed derivatives are carefully dried and pulverized under conditions to maintain their water-solubility and prevent molecular degradation.

The CM-RCLs of the present invention have CM DS lower limit of about 0.4, preferably about 0.8, and more preferably about 1.0. The upper limit of the CM DS of the CM-RCL is about 2.2, preferably about 1.5, and more preferably about 1.2. Despite their high DS, samples of the present invention were found to provide significantly higher 1% solution Brookfield viscosity measured with spindle #4 at 30 rpm than the currently available commercial CMCs or PACs made from purified cotton linters.

In accordance with the present invention, the water-based drilling mud composition can contain a CM-RCL that contains aluminum, ferrous, ferric, zinc, nickel, tin(2), or tin(4) as countercations and nitrilotriacetic acid, 1,2-cylohexanediamine-N,N,N',N'-tetraacetic acid, diethylenetriamine pentaacetic acid, ethylenedioxy-bis(ethylenenitrilo) tetraacetic acid, N-(2-hydroxyethyl)-ethylenediamino-N,N',N'-triacetic acid, triethylenetetraamine hexaacetic acid or N-(2-hydroxyethyl)ethylenediaminetriacetic acid as a ligand. The countercation can also be calcium.

The present invention also describes the use of CM-RCLs in water-based drilling fluids. The water-based drilling fluids of the present invention comprise the novel CM-RCL. To achieve desired and improved application properties in water-based drilling fluids, the CM-RCL or its mixed derivatives can be used alone or in combination with other water-soluble or water-swellable polymers as secondary fluid loss control additives, such as cellulose ethers (CMC, PAC, HEC, CMHEC, cationic CMC), starch and its derivatives, guar gum and its derivatives, xanthan gums, resins, resinated lignite, synthetic polymers and copolymers of acrylamide, acrylic acid, 2-acrylamido-2-methylpropanesulfonic acid (AMPS), and polyglycols. In addition to these polymers the drilling fluid would optionally contain other additives conventionally employed in water-based drilling fluids. These include clays, electrolytes, weighting agents, glycols, dispersants, flocculents, and other water-soluble and water-swellable polymers etc. to optimise the desired performance properties in a given application.

Polymeric Additives

A wide variety of organic polymers also serve a number of useful purposes in drilling fluids such as controlling the rheology and filtration rates, which often are directly related to the degree of flocculation and aggregation of clay particles in the drilling mud. Among other factors, fluid loss control properties are particularly affected by the formation of a deflocculated and thin filter-cake on the wellbore formation, resulting from a well-dispersed clay suspension. These polymers include, but not limited to, guar gum and its derivatives, xanthan gum, wellan gum and other biopolymers (i.e., alginate, carrageenan, and scleroglucan), starch and its derivatives, cellulose ethers, lignite and lignosulfonate, and synthetic polymers such as polyacrylates and polyacrylamides, wherein the polymeric additive and/or dispersants exclude polycarboxylic acid having a number average molecular weight not exceeding 3,000 selected from the group consisting of a homopolymer of acrylic acid, a homopolymer of methacrylic acid, a copolymer of acrylic acid and methacrylic acid, and a water-soluble salt of any of the foregoing acids.

Finely Divided Clay Particles

Commercially available clays are commonly used for increasing the viscosity of drilling fluids. Preferably, smectite type clays, such as montmorillonites (bentonite) are used, as well as mixed layer types, such as mixed layer hydroxides (calcium hydroxide) and attapulgite and sepiolite and saponite. Bentonite is the most preferred viscosity builder either alone or in combination with other commercial clays. The amount of these finely divided clay particles used in drilling fluids is determined by the composition of the borehole. These materials are used either alone or in combination with polymeric additives in the general range of a lower limit of about 1.0 lb/bbl (pound per barrel) based on the total weight of the composition, preferably about 3.0 lb/bbl, and more preferably 5.0 lb/bbl. The upper limit amount of the finely divided solid particles is about 50.0 lb/bbl, preferably 20.0 lb/bbl, and more preferably 10.0 lb/bbl based on the weight of the total composition.

Inorganic Salts

Fresh or seawater muds may be treated with gypsum or lime to alleviate drilling problems that may arise from drilling water-sensitive shale or clay bearing formations. Gypsum muds are generally maintained at a pH of 9-10, whereas lime muds have a pH of 12-13. Calcium treated muds generally require more additives to control flow and filtration properties than would be required without the presence of gypsum or lime. Potassium ion source, primarily potassium chloride, is used in combination with one or more polymers in order to prevent problems associated with drilling certain water-sensitive shales.

Shale Stabilizers

Unstable shales can cause packing off and sticking when they spill into the wellbore. The shales may be reactive, pressured or fractured. While the pressured and fractured shales are related to the mechanical stress of the formation, the reactive shales are water-sensitive and interact with the drilling fluid; they absorb the water and become stressed and spill into the wellbore. This issue becomes more problematic when drilling with insufficient inhibition. To control the formation instability due to reactive shales, shale-stabilizing agents are often added to the mud composition. The shale stabilizer agent is selected from the group comprising of, but not limited to, partially hydrolyzed polyacrylamides (PH-PAs), potassium chloride, potassium acetate, potassium carbonate, potassium hydroxide, sulfonated asphalt, blown asphalt, gilsonite, polyglycols, poly amino acids, surfactants, cationic polymers and mixed metal hydroxide (MMH).

Dispersants/Thinners

Dispersants/deflocculents or thinners are extensively used to break up the flocculated clumps by separating aggregated or stacked sheets of clay during drilling operations. The main objective of using these additives is to reduce the gel strength and yield value resulting from clay aggregates. Different types of useful dispersants are used in the oil industry such as, but not limited to, lignite, causticized lignite, causticized potassium lignite, chrome lignite, chrome lignosulfonate, ferrochrome lignosulfonate, chrome-free lignosulfonate, tannin and modified chrome tannin, low molecular weight polyacrylates, sodium tetraphosphate, sodium pyrophosphate, and sulfonated synthetic polymers.

Since a large variety of WBM compositions exist, the selection of the most suitable dispersant is made particularly on the basis of the alkalinity and the salinity of the fluid system. For example, polyphosphates, tannin and lignin thinners are not very effective in the presence of flocculating concentrations of salts. Their precipitation with polyvalent cations largely reduces their thinning efficiency. They are, therefore, used principally in freshwater-based systems along with sodium hydroxide to form the alkaline soluble salt. On the other hand, chrome lignosulfonates are operative in muds ranging from freshwater to highly saline at pH values corresponding to the pH of the swollen bentonite.

Weighting Agents

Weighting agents are used to control the density of the mud depending upon the formation pressure. While barite is the most common weighting agent used in drilling muds, hematite, manganese oxide and sized calcium carbonate made from ground limestone or marble are also used depending upon the desired mud weight.

Other Functional Additives

Depending upon the nature of the drilled formation and the selected mud composition, many other functional additives may be added to the drilling fluid to fulfil particular technical requirements. For example, lubricant agents comprising glycols, asphalts, esters and blends thereof, are used to reduce metal-to-formation and metal-to-metal frictions. Also, corrosion inhibitors are designed to protect all oilfield tubular goods to help prevent general corrosion attack on casing, tubing and downhole tools in contact with the drilling fluid. Examples of corrosion inhibitors are amine-based or inorganic thiocyanate-base additives. Oxygen scavengers (e.g., potassium bisulfite, potassium meta-bisulfite, and sodium sulfite) and pH control agents can also be used in the drilling fluid for particular situations in the hole formation. Examples of pH control agents for use in drilling fluids are sodium hydroxide (NaOH), magnesium oxide (MgO), sodium bicarbonate (NaHCO$_3$), calcium oxide (CaO), potassium hydroxide (KOH), and mixtures thereof.

The following Examples will serve to provide specific illustrations of the practice of this invention in WBMs and drilling fluids but they are not intended in any way to limit the scope of this invention.

EXAMPLE 1

Fine cut RCL (52.7 g; "as is" weight (bulk density ~26 g/100 ml) was added to a reactor containing a mixture of isopropyl alcohol (IPA) (473 g) and methanol (24 g) and mixed to form a slurry. After sealing the reactor, the RCL slurry was cooled to 20° C. and agitated at 100-600 rpm to achieve good and uniform mixing.

The reactor was made oxygen-free and sodium hydroxide solution (44.97 g of sodium hydroxide dissolved in 73.4 g of water) was added to the RCL slurry. The resulting RCL slurry was mixed at 20° C. for 1 h.

Then monochloroacetic acid (MCA) solution (51.53 g of MCA dissolved in 51.53 g of isopropanol) was added to the RCL slurry and the resulting reaction mixture was heated at 70° C. for 1 hour, cooled to room temperature and filtered. The dark brown residue was slurried in 80% (w/w) methanol/water mixture (800 g) and treated with glacial acetic acid (2.7 g). The resulting slurry was washed three times with 80% (w/w) methanol/water and filtered. The filtered cake was then dried in a fluid bed dryer at 25° C. for 5 min, at 50° C. for 10 minutes and at 70° C. for 20 minutes.

The carboxymethyl degree of substitution (CM DS) of the carboxymethylated raw cotton linters (CM-RCL) was 1.05. The 1% solution Brookfield viscosity of the CM-RCL was 7040 cps as measured on a Brookfield DV-I+viscometer using a spindle #4 at 30 rpm at 25° C.

EXAMPLE 2

Example 1 was repeated using the following ingredients. The RCL was alkalized using ingredients 1 through 5. After adding ingredients 6 through 9, the reaction mixture was heated at 70° C. for 0.5 hour. Then ingredients 10 and 11 were added and the resulting reaction mixture heated at 70° C. for 45 minutes.

1. Second-cut raw cotton linters −53.7 g (as is")
2. Isopropanol −368.2 g
3. Methanol—19.5 g
4. Water—68.8 g
5. Sodium hydroxide (97.6% pure)—31.26 g
6. Isopropanol—30.6 g
7. Water—7.35 g
8. Monochloroacetic acid (99.5% pure)—44 g
9. Dichloroacetic acid—0.44 g
10. Water—2.6 g
11. Sodium hydroxide (97.6% pure)—8 g The CM DS of the CM-RCL was ~1.18. The 1% solution Brookfield viscosity of the CM-RCL was 10,980 cPs as measured on a Brookfield DV-I+viscometer using a spindle # 4 at 30 rpm at 25° C.

EXAMPLE 3

Example 2 was repeated using 0.88 g of dichloroacetic acid.

The CM DS of the CM-RCL was ~1.18. The 1% solution Brookfield viscosity of the CM-RCL was 11,700 cPs as measured on a Brookfield DV-I+viscometer using a spindle # 4 at 30 rpm at 25° C.

EXAMPLE 4

Comparative Characteristics of Various CM-RCL and Commercial PAC Samples

To demonstrate the effectiveness and advantages of CM-RCL over various PACs, the performances of various commercially available PACs were compared against those of CM-RCLs of the present invention. Commercially available PACs tested include standard and premium quality PAC samples.

The standard quality commercial PAC samples tested were:
a) AquaFLO™HV PAC (available from Aqualon Company, a division of Hercules Incorporated, Wilmington, Del.),
b) Celpol® PAC R (available from Noviant, Nijmegen, The Netherlands) and
c) Staflo® Regular PAC (available from Akzo-Nobel, Amesfoort, The Netherlands).

The premium quality PAC samples evaluated were:
a) AquaPAC® Regular PAC (available from Aqualon Company, a division of Hercules Incorporated, Wilmington, Del.), and
b) Celpol® RX PAC (available from Noviant).

The degree of substitution (CM-DS) and 1% solution Brookfield viscosity (measured at 25° C. using spindle # 4 at 30 rpm) of these PACs and CM-RCL are shown in Table 1.

TABLE 1

Analytical data of various CM-RCL and commercial PACs

| Product | Moisture, % | CM DS | 1% Solution Brookfield viscosity[3] (cPs) |
|---|---|---|---|
| CM-RCL[1] | 5.02 | 1.18 | 9913 |
| AquaPAC ® Regular PAC[2] | 5.37 | 1.03 | 5010 |
| Celpol ® RX PAC | 7.54 | 1.15 | 4810 |
| AquaFLO ™ HV PAC | 7.23 | 0.91 | 3400 |
| Celpol ® R PAC | 7.97 | 0.91 | 3320 |
| Staflo ® Regular PAC | 4.55 | 0.88 | 2000 |

[1]Average of 3 samples made according to Ex. 2
[2]Average of 4 samples
[3]Measured at 25° C. using spindle #4 at 30 rpm As can be seen from data in Table 1, CM-RCL samples of the present invention provide significantly higher 1% solution Brookfield viscosity than existing PAC samples made from purified cotton linters. Generally, the solution viscosity of CMC or PAC decreases as the carboxymethyl degree of substitution (CM DS) increases. It was surprising to find that the CM-RCL samples exhibited higher solution viscosity despite their higher CM DS relative to that of existing CMCs or PACs.

EXAMPLE 5

Comparative Drilling Fluid Performance Properties of Various CM-RCL and Commercial PAC Samples Performance properties of CM-RCL samples of the present invention and those of commercially available PAC samples were evaluated on the basis of their contribution to the viscosity and fluid loss reduction of typical oil-field salt based drilling fluids. The viscosifying capacity of the samples was further investigated in solids-free clear drilling fluids.

i) Evaluation of CM-RCL in Solids-Free Clear Drilling Fluids

The solution viscosity of all the polymer samples was measured in three different fluid systems. These include deionized water (fresh water), potassium chloride (KCl)/sea salt water and sodium chloride saturated water (SSW). The potassium chloride (KCl)/sea salt water stock solution was prepared by dissolving 42 g of sea salt in 1000 ml deionized water and then adding 35 g of KCl to 358 g (350 ml) of the stock solution. The SSW was prepared by dissolving 360 g of sodium chloride in 1000 ml of deionized water. Then appropriate amount of the polymer (see data in Table 2) was added to 350 ml (lab barrel equivalent) of the previously described clear fluids and mixed for 20 minutes with Hamilton Beach mixer at ~11500 rpm. After static ageing of the resulting solution in a water bath set at 25° C. for 2 hours, the apparent viscosity of the solution was measured using a Fann type viscometer. The viscosity data represent the apparent viscosity of polymer solutions (dial reading while running at 600 rpm, corresponding to 1021 s$^{-1}$ shear rate). The apparent viscosity is calculated as "600 rpm dial reading divided by 2". This designation is standard and well known in the oil industry.

As can be seen from data in Table 2, CM-RCLs exhibited significantly higher Fann apparent viscosity than existing standard PACs and at least as high as premium PAC made from purified cotton linters.

TABLE 2

Comparative Apparent Viscosity in Solids-Free Clear Fluids

| Polymer | Fann Apparent Viscosity, cPs | | |
|---|---|---|---|
| | @ 3 lb/bbl[3] in KCl/Sea salt water | @ 2 lb/bbl in FW | @ 2.5 lb/bbl in SSW |
| CM-RCL[1] | 73.92 | 49.17 | 75.50 |
| AquaPAC ® Regular PAC[2] | 67.56 | 51.81 | 72.81 |
| Celpol ® RX PAC | 73.50 | 48.75 | 75.75 |
| AquaFLO ™ HV PAC | 58.75 | 41.25 | 64.00 |
| Celpol ® R PAC | 55.13 | 38.50 | 59.00 |
| Staflo ® Regular PAC | 55.75 | 40.75 | 61.50 |

[1]Average of 3 samples made according to Ex. 2
[2]Average of 4 samples
[3]lb/bbl = pound/barrel ii) Evaluation of CM-RCL in Solids-Laden Drilling Fluids At present, there is no universally accepted industry standard test procedure to evaluate PAC performance in drilling fluids. However, there are various test procedures developed by operators and mud companies. The test procedure developed by CHEVRON Petroleum company (Houston, Tex.), referred to here as "CHEVRON" test procedure, is considered as one of the most stringent test procedures available in the industry that enables to differentiate premium quality PAC from poor performing materials. This procedure was therefore used to assess the performances of the CM-RCL samples of the present invention. In addition, the CM-RCL samples were further evaluated according to the "PAC superiority" test procedure developed by Aqualon Company that enables one to determine the PAC "true" performance efficiency to achieve particular filtration control properties.

The filtration control properties of the polymers were measured as a filtrate volume (fluid loss) collected after 30 minutes under 7 bars (100 psi) as defined by the American Petroleum Institute (API). The target outstanding 30-minute API filtrate volume achievable with CM-RCL of the present invention, in accordance with both test procedures ("CHEVRON" test at 0.75 lb/bbl and PAC Superiority test at 1.00 lb/bbl), was preferably set to less than 17 ml, more preferably less than 15 ml and most preferably less than 13 ml.

ii.a) Fluid Loss Control Properties with "CHEVRON" Test Procedure in Potassium Chloride (KCl)/Seawater Based Fluids A KCl/seawater based fluid was used to assess the effectiveness of PAC materials. Poor performing PACs would not give the desired filtration reduction and consequently would not meet CHEVRON specifications. The test procedure involves preparation of a salt stock solution and a pre-hydrated bentonite suspension used as a base to make the drilling fluids.

Stock volume (3500 ml) of the salt base slurry was prepared by dissolving 157.5 g of KCl and 105 g of sea-salt in 3.5 liter deionized water with a dispersator at 8500+/−1000 rpm. When the salts were fully dissolved, the salt stock solution is stored in a sealed container until ready for use. In parallel, a pre-hydrated bentonite suspension is prepared by sifting 350 g of non-treated Aquagel bentonite (available from Baroid Drilling Fluids, Houston, Tex.) into 3.5 liters deionized water and dispersed at 8500+/−1000 rpm. The resulting bentonite suspension was then left to hydrate in a closed container for at least 16 hours at room temperature prior to use. The test drilling fluid was prepared with Hamilton Beach mixer (~11500 rpm) by adding 259.5 g of the salt stock solution into a mixing cup, followed by the addition of 106 g of the pre-hydrated bentonite suspension and 10.5 g of Rev-dust (available from Milwhite Company, Houston, Tex.). The pH was adjusted to 11.8-11.9 by adding 0.75 ml of 5N sodium hydroxide solution. After the lapsed mixing time, 0.75 g (corrected to 8% moisture) of the candidate polymer was added to the suspension and mixed for 20 minutes. The samples were then static aged in a sealed container for 16 hours prior to measurements. The efficiency of candidate polymers was then determined by measuring the fluid loss properties. Poor performing polymers will not give the desired filtration reduction.

Table 3 shows the filtrate volumes, collected after 30 minutes under 100 psi pressure, for the CM-RCL of the present invention and the data are compared against those of commercial high viscosity PAC materials. As can be seen from data in Table 3, outstanding fluid loss control properties were surprisingly achieved with CM-RCL. The fluid loss control capacity provided by CM-RCL samples was at least 35% better compared to currently available premium PACs made from purified cotton linters

TABLE 3

Comparative Fluid Loss in KCl/Sea Salt Water Based Drilling Fluid

| Product | 30' API Fluid Loss (ml) |
|---|---|
| CM-RCL[1] | 11.2 |
| AquaPAC ® Regular PAC[2] | 18.4 |
| Celpol ® RX PAC | 18.4 |
| AquaFLO ™ HV PAC | 35.0 |
| Celpol ® R PAC | 40.4 |
| Staflo ® Regular PAC | 30.7 |

[1]Average of 3 samples made according to Ex. 2
[2]Average of 4 samples ii.b) Performance Evaluation with "PAC Superiority" Test Procedure in NaCl Saturated Based Drilling Fluid The performance test is carried out in sodium chloride saturated drilling fluids containing 10 lb/bbl pre-hydrated Aquagel bentonite, 10 lb/bbl Rev-Dust and variable polymer concentrations. The Rev-dust is used to simulate the presence of cuttings in the drilling fluid during the drilling process. The PAC materials were evaluated on the basis of their contribution to the viscosity development and fluid loss reduction of the drilling fluid.

The test drilling fluid was prepared in a Hamilton Beach mixer (~11500 rpm) by adding 125 lb/bbl sodium chloride into a mixing cup containing 356 g (350 ml) of pre-hydrated bentonite and mixing the resulting mixture for 5 minutes. The Rev-dust was then added and the suspension was mixed for an additional 5 minutes. Then, the PAC material or CM-RCL was added and mixed for an elapsed time of 20 minutes. Measurement of both Fann apparent viscosity as well as fluid loss properties was then performed after 2 hours static ageing in a water bath at 25° C.

ii.b.1) Fann Apparent Viscosity of CM-RCL and Commercial PACs in NaCl Saturated Drilling Fluid Table 4 shows the Fann apparent viscosity of the drilling fluid at variable polymer concentrations. As can be seen from data, CM-RCL of the present invention exhibited the highest contribution to the viscosity development of the drilling fluid at all polymer concentrations. The CM-RCL, surprisingly, developed more than 4 cPs higher apparent viscosity as compared to that of the currently available premium PACs made from purified cotton linters.

TABLE 4

Comparative Apparent viscosity of CM-RCL and Commercial PACs in Sodium Chloride Saturated Fluid

| Polymer | Fann Apparent Viscosity (cPs) at polymer concentration | | | |
|---|---|---|---|---|
| | 1.00 lb/bbl | 1.25 lb/bbl | 1.50 lb/bbl | 2.00 lb/bbl |
| CM-RCL[1] | 20.17 | 25.58 | 33.25 | 48.25 |
| AquaPAC ® Regular PAC[2] | 14.06 | 20.63 | 27.88 | 40.75 |
| Celpol ® RX PAC | 16.00 | 21.50 | 28.00 | — |
| AquaFLO ™ HV PAC | 11.75 | 17.50 | 22.50 | 33.00 |
| Celpol ® R PAC | 11.00 | 15.75 | 20.75 | — |
| Staflo ® Regular PAC | 11.50 | 17.00 | 22.75 | — |

[1]Average of 3 samples made according to Ex. 2
[2]Average of 4 samples ii.b.2) Fluid Loss Control Properties of CM-RCL and Commercial PACs in Sodium Chloride Saturated Drilling Fluid Table 5 provides comparative fluid loss results at variable polymer concentrations. The fluid loss property decreases as a function of the polymer concentration following an exponential or a power-law trend. Data show that the difference between filtrate volumes was less pronounced for PAC concentrations over 1.25 lb/bbl. For all tested PAC and CM-RCL samples, the large performance difference between the samples to efficiently control the filtration properties was mainly observed at low polymer concentrations. Similar to the results described earlier with "CHEVRON" test procedure, CM-RCL of the present invention provides improved fluid loss control results, at lower dosage (1.0 lb/bbl), compared to PAC samples made from purified cotton linters.

TABLE 5

Comparison of Fluid Loss Control Properties of CM-RCL and Commercial PACs in Sodium Chloride Saturated Drilling Fluid

| Polymer | 30' API Fluid Loss (ml) at polymer concentration of | | | |
|---|---|---|---|---|
| | 1.00 lb/bbl | 1.25 lb/bbl | 1.50 lb/bbl | 2.00 lb/bbl |
| CM-RCL[1] | 9.8 | 8.1 | 6.4 | 5.8 |
| AquaPAC ® Regular PAC[2] | 12.8 | 8.0 | 6.5 | 5.7 |
| Celpol ® RX PAC | 11.4 | 7.5 | 6.8 | |
| AquaFLO ™ HV PAC | 17.4 | 10.5 | 7.4 | 6.9 |
| Celpol ® R PAC | 19.4 | 12.6 | 8.0 | |
| Staflo ® Regular PAC | 17.8 | 10.0 | 7.2 | |

[1]Average of 3 samples made according to Ex. 2
[2]Average of 4 samples ii.b.3) Comparison of Performance Efficiency of CM-RCL and Commercial PACs The performance efficiency of the polymers was determined by the amount of the polymer (PAC or CM-RCL) material required to achieve a 30-minutes API fluid loss of 10 ml.

The amount of polymers needed for various commercial PACs and CM-RCL of the present invention are shown in Table 6. It is evident from data in Table 6 that the CM-RCL of the present invention is more efficient compared to the PACs made from purified cotton linters. The performance of CM-RCL represents an efficiency of a least 11% better than the closest competitive PAC. On field usage, the higher performance efficiency can be translated into higher "yield". The yield of polymers is defined as the volume of mud, having a certain fluid loss property, which can be prepared with 1-metric ton of polymer. In our case the polymer yield is calculated on the basis of 10-ml fluid loss requirement. It is calculated using a special formula (350 divided by the polymer concentration (lb/bbl) to get 10-ml fluid loss) and expressed in $m^3$/MT of polymer. Data in Table 6 clearly shows that CM-RCL material permits making up at least 37 $m^3$ additional volume of mud having 10-ml fluid loss relative to other PAC materials made from purified cotton linters.

TABLE 6

Comparison of Performance Efficiency of CM-RCL and Commercial PACs to achieve 10-ml Fluid Loss (FL)

| Polymer | Amount of polymer required to achieve 10 ml FL (lb/bbl) | PAC Yield (Volume of mud that has 10 ml FL) ($m^3$/MT) | Additional amount of commercial PAC required Vs CM-RCL to achieve 10 ml FL (%) |
|---|---|---|---|
| CM-RCL[1] | 0.98 | 358.6 | |
| AquaPAC ® Regular PAC[2] | 1.14 | 305.7 | +17.3 |
| Celpol ® RX PAC | 1.09 | 321.2 | +11.7 |
| AquaFLO ™ HV PAC | 1.29 | 271.3 | +32.2 |
| Celpol ® R PAC | 1.39 | 251.6 | +42.6 |
| Staflo ® Regular PAC | 1.25 | 280.0 | +28.1 |

[1]Average of 3 samples made according to Ex. 2
[2]Average of 4 samples

Advantages of CM-RCL

In summary, the advantages of CM-RCL material in accordance with the present invention in drilling fluids, as compared to commonly used PACs made from purified cotton linters, in above cited examples include, are:
- Higher viscosity profile in sodium chloride (NaCl) saturated drilling fluids,
- Better cost-efficiency to achieve 10-ml fluid loss volume in sodium chloride (NaCl) saturated drilling fluids
- Higher polymer yield in sodium chloride (NaCl) saturated drilling fluids
- Better fluid loss control properties in potassium chloride (KCl)/seawater based muds (CHEVRON test procedure)

What is claimed is:

1. A water-based drilling fluid composition comprising water and at least one rheology modifier and/or fluid loss control agent, and at least one other ingredient selected from the group consisting of polymeric additive, inorganic salts, dispersants, shale stabilizers or inhibitors, weighting agents, and finely divided clay particles, depending upon the desired attributes, wherein the rheology modifier and/or the fluid loss control agent comprises carboxymethylated raw cotton linters (CM-RCL) and/or salts thereof, wherein the polymeric additive and/or dispersants exclude polycarboxylic selected from the group consisting of a homopolymer of acrylic acid, a homopolymer of methacrylic acid, a copolymer of acrylic acid and methacrylic acid, and a water-soluble salt of any of the foregoing acids, wherein the polycarboxylic acid has a number average molecular weight not exceeding 3,000, and wherein the CM-RCL is prepared from raw cotton linters containing about 80-85% cellulose, about 1.5-2.5% lignin and about 2.5-3.5% hemicellulose.

2. The water-based drilling fluid composition of claim 1, wherein the water-based drilling fluid composition provides a 30-minute API filtrate volume of less than 17 ml based on both Chevron test procedure in KCl/seawater based mud at a concentration of 0.75 lb/bbl and PAC Superiority test procedure at a concentration of 1.0 lb/bbl.

3. The water-based drilling fluid composition of claim 1, wherein the water-based drilling fluid composition provides a 30-minute API filtrate volume of less than 15 ml based on both Chevron test procedure in KCl/seawater based mud at a concentration of 0.75 lb/bbl and PAC Superiority test procedure at a concentration of 1.0 lb/bbl.

4. The water-based drilling fluid composition of claim 1, wherein the water-based drilling fluid composition provides a 30-minute API filtrate volume of less than 13 ml based on both Chevron test procedure in KCl/seawater based mud at a concentration of 0.75 lb/bbl and PAC Superiority test procedure at a concentration of 1.0 lb/bbl.

5. The water-based drilling fluid composition of claim 1, wherein the CM-RCL has a carboxymethyl degree of substitution (CM DS) lower limit of about 0.4.

6. The water-based drilling fluid composition of claim 1, wherein the CM-RCL has a carboxymethyl degree of substitution (CM DS) lower limit of about 0.8.

7. The water-based drilling fluid composition of claim 1, wherein the CM-RCL has a carboxymethyl degree of substitution (CM DS) lower limit of about 1.0.

8. The water-based drilling fluid composition of claim 1, wherein the CM-RCL has a carboxymethyl degree of substitution (CM DS) upper limit of about 2.2.

9. The water-based drilling fluid composition of claim 1, wherein the CM-RCL has a carboxymethyl degree of substitution (CM DS) upper limit of about 1.5.

10. The water-based drilling fluid composition of claim 1, wherein the CM-RCL has a carboxymethyl degree of substitution (CM DS) upper limit of about 1.2.

11. The water-based drilling fluid composition of claim 1, wherein other polymeric additives are present and selected from the group consisting of starch and its derivatives, guar gum and its derivatives, xanthan gum, wellan gum, other biopolymers, cellulose ethers, polyacrylates of molecular weight greater than 3000, polyacrylamides, lignite, lignosulfonate, and mixtures thereof.

12. The water-based drilling fluid composition of claim 1, wherein inorganic salts are present and selected from the group consisting of calcium carbonate, calcium chloride, potassium chloride, sodium chloride, magnesium chloride, and mixtures thereof.

13. The water-based drilling fluid composition of claim 1, wherein dispersants are present and selected from the group consisting of causticized lignite, causticized potassium lignite, chrome lignite, chrome lignosulfonate, ferrochrome lignosulfonate, chrome-free lignosulfonate, tannin and modified chrome tannin, polyacrylates of molecular weight greater than 3000, sodium tetraphosphate, sodium pyrophosphate, sulfonated synthetic polymers, and mixtures thereof.

14. The water-based drilling fluid composition of claim 1, wherein shale stabilizers or inhibitors are present and selected from the group consisting of partially hydrolyzed polyacrylamides (PHPA), potassium chloride, potassium acetate, potassium carbonate, potassium hydroxide, sulfonated asphalt, blown asphalt, gilsonite, polyglycols, poly amino acids, surfactants, cationic polymers, mixed metal hydroxides (MMH), and mixtures thereof.

15. The water-based drilling fluid composition of claim 1, wherein weighting agents are present and selected from the group consisting of barite, hematite, manganese oxide, sized calcium carbonate made from ground limestone or marble, and mixtures thereof.

16. The water-based drilling fluid composition of claim 1, wherein finely divided clay particles are present and selected from the group consisting of bentonite, attapulgite, sepiolite, saponite, and mixtures thereof.

17. The water-based drilling fluid composition of claim 1, wherein a lubricant is present and selected from the group consisting of glycol, asphalt, and mixtures thereof.

18. The water-based drilling fluid composition of claim 1, wherein a corrosion inhibitor is present and selected from the group consisting of amine, inorganic thiocyanate, and mixtures thereof.

19. The water-based drilling fluid composition of claim 18, wherein the inorganic thiocyanate is selected from the group consisting of potassium thiocyanate, sodium thiocyanate, and ammonium thiocyanate.

20. The water-based drilling fluid composition of claim 1, wherein a secondary fluid loss control agent is also present.

21. The water-based drilling fluid composition of claim 20, wherein the secondary fluid loss control agent is selected from the group consisting of liquid resins, resinated lignite, starch and its derivatives, cellulose ethers, guar and its derivatives, polyacrylates, polyacrylamides, 2-acrylamido-2-methylpropanesulfonic acid (AMPS) based copolymers, and polyglycols.

22. The water-based drilling fluid composition of claim 1, wherein the drilling fluid further comprises biopolymers as a primary rheology modifier.

23. The water-based drilling fluid composition of claim 22, wherein the biopolymers are selected from the group consisting of xanthan gum, wellan gum, and gum guar.

24. The water-based drilling fluid composition of claim 1, wherein the drilling fluid further comprises an oxygen scavenger.

25. The water-based drilling fluid composition of claim 1, wherein the drilling fluid further comprises a pH control agent selected from the group consisting of sodium hydroxide (NaOH), magnesium oxide (MgO), sodium bicarbonate (NaHCO$_3$), calcium oxide (CaO), potassium hydroxide (KOH), and mixtures thereof.

26. The water-based drilling fluid composition of claim 1, wherein the CM-RCL contains a member selected from the group consisting of potassium, lithium, sodium, calcium, aluminum, barium, magnesium, ammonium ions, and mixtures thereof as counter-cations.

27. The water-based drilling fluid composition of claim 26, wherein the CM-RCL containing potassium ions as countercations is produced by alkalizing raw cotton linters with potassium hydroxide and reacting the alkalized raw cotton linters with potassium chloroacetate.

28. The water-based drilling fluid composition of claim 1, wherein the CM-RCL contains salts of barium (II), calcium (II), strontium (II), magnesium (II), chromium (II), titanium (IV), aluminum (III), iron (II), iron (III), zinc (II), nickel (II), tin (II), or tin (IV) and nitrilo-triacetic acid, 1,2-cylohexanediamine-N,N,N',N'-tetra-acetic acid, diethylenetriamine-pentaacetic acid, ethylenedioxy-bis(ethylene-nitrilo)-tetraacetic acid, N-(2-hydroxyethyl)-ethylenediamino-N,N',N'-triacetic acid, triethylene-tetraamine-hexaacetic acid or N-(hydroxyethyl) ethylenediamine-triacetic acid or a mixture thereof as a ligand.

29. The water-based drilling fluid composition of claim 28, wherein the amount of salts based on dry weight of CM-RCL is 0.1-25 wt %.

30. The water-based drilling fluid composition of claim 1, wherein the CM-RCL contains hydroxyalkyl groups.

31. The water-based drilling fluid composition of claim 30, wherein the hydroxyalkyl groups are selected from the members consisting of hydroxyethyl groups, hydroxypropyl groups, and hydroxybutyl groups.

32. The water-based drilling fluid composition of claim 1, wherein the CM-RCL contains C$_1$-C$_{30}$ alkyl groups.

33. The water-based drilling fluid composition of claim 1, wherein the CM-RCL contains sulfoethyl groups.

34. The water-based drilling fluid composition of claim 1, wherein the CM-RCL is modified with a cationic group comprising quaternary ammonium group.

35. The water-based drilling fluid composition of claim 34, wherein the quaternary ammonium group that is incorporated into the CM-RCL using cationic reagents is selected from the group consisting of 3-chloro-2-hydroxypropylmethyl ammonium chloride, 3-chloro-2-hydroxypropyl trimethyl ammonium chloride, 3-chloro-2-hydroxypropyl dimethyl benzyl ammonium chloride, 2,3-epoxypropyl dimethyl benzyl ammonium chloride, 3-chloro-2-hydroxypropyl dimethyldodecyl ammonium chloride, 3-chloro-2-hydroxypropyl dimethyloctadecyl ammonium chloride, 3-chloro-2-hydroxypropyl dimethyltetradecyl ammonium chloride, 3-chloro-2-hydroxypropyl dimethyloctadecyl ammonium chloride, 3-chloro-2-hydroxypropyl dimethylhexadecyl ammonium chloride, 3-chloro-2-hydroxypropyl dimethyloctyl ammonium chloride, 3-chloro-2-hydroxypropyl trimethyldodecyl ammonium chloride, 2-chloroethyl trimethyl ammonium chloride and 2,3-epoxypropyl trimethyl ammonium chloride.

36. The water-based drilling fluid composition of claim 34 wherein the cationic degree of substitution of the cationically modified CM-RCL is from about 0.0005 to about 0.9.

37. The water-based drilling fluid composition of claim 1, further comprises at least one amphoteric polymer, selected from the class consisting of partially hydrolyzed polyacrylamide containing quaternary ammonium groups, partially hydrolyzed poly(acrylamide-co-acrylates) containing quaternary ammonium groups, carboxymethylated cellulose derivatives containing quaternary ammonium groups, carboxymethylated starch derivatives containing quaternary ammonium groups, carboxymethylated guar derivatives containing quaternary ammonium groups and mixtures thereof.

38. The water-based drilling fluid composition of claim 1, wherein the CM-RCL contains dimethylaminoethyl methacrylate groups.

39. The water-based drilling fluid composition of claim 1, wherein the CM-RCL contains both sulfoethyl and cationic groups.

40. The water-based drilling fluid composition of claim 1, wherein the molecular weight of the CM-RCL is reduced.

41. The water-based drilling fluid composition of claim 40, wherein the molecular weight of the CM-RCL is reduced by treating the CM-RCL with a member of molecular weight reducing agents selected from the group consisting of an acid, hypochlorites, chlorites, a mixture of caustic and oxygen, peroxides, cellulolytic enzymes, and radiation.

42. The water-based drilling fluid composition of claim 40, wherein the molecular weight reduction of the CM-RCL is carried out in a solution or slurry process.

43. The water-based drilling fluid composition of claim 1, wherein high molecular weight CM-RCL is used in combination with molecular weight reduced CM-RCL to further improve the fluid control properties.

44. The water-based drilling fluid composition of claim 1, wherein the CM-RCL is not purified.

45. The water-based drilling fluid composition of claim 1, wherein the CM-RCL has an assay of 40 wt %.

46. The water-based drilling fluid composition of claim 1, wherein the CM-RCL has en essay of 65 wt %.

47. The water-based drilling fluid composition of claim 1, wherein the CM-RCL has an assay of 98 wt %.

48. The water-based drilling fluid composition of claim 1, wherein the raw cotton linters used to make the CM-RCL is uncut.

49. The water-based drilling fluid composition of claim 1, wherein the raw cotton linters used to make the CM-RCL is cut.

50. The water-based drilling fluid composition of claim 49, wherein the cut raw cotton linters is a loose mass of comminuted raw cotton linter fibers that a) has a bulk density of at least 8 g/100 ml and b) at least 50 wt % of the fibers in the loose mass passes through a US standard sieve size #10 (2 mm openings).

51. The water-based drilling fluid composition of claim 1, wherein the CM-RCL is used in combination with cellulose ethers made from purified cotton linters or wood pulps.

52. The water-based drilling fluid composition of claim 51, wherein the cellulose ethers are selected from the group consisting of carboxymethyl-cellulose (CMC), hydroxyethylcellulose (HEC), carboxymethyl-hydroxyethylcellulose (CMHEC) and polyanlonic cellulose (PAC).

53. The water-based drilling fluid composition of claim 41, wherein the molecular weight reducing agent is hydrogen peroxide or sodium peroxide.

* * * * *